United States Patent [19]

Hyodo

[11] Patent Number: 5,033,570
[45] Date of Patent: Jul. 23, 1991

[54] FIXED OPERATING SPEED CONTROL DEVICE

[75] Inventor: Hitoshi Hyodo, Okazaki, Japan

[73] Assignee: Aisin Seiki K.K., Aichi, Japan

[21] Appl. No.: 511,903

[22] Filed: Apr. 23, 1990

Related U.S. Application Data

[63] Continuation of Ser. No. 250,880, Sep. 29, 1988, abandoned.

[30] Foreign Application Priority Data

Sep. 29, 1987 [JP] Japan .................. 62-246724

[51] Int. Cl.⁵ .......................................... B60K 31/10
[52] U.S. Cl. .................................. 180/176; 180/177;
123/360; 364/426.04
[58] Field of Search ............... 180/175, 176, 177, 178,
180/179, 171; 123/352, 360, 361, 399;
364/426.04, 426.05, 431.07

[56] References Cited

U.S. PATENT DOCUMENTS

| | | | |
|---|---|---|---|
| 4,522,280 | 6/1985 | Blaney | 180/179 X |
| 4,553,209 | 11/1985 | Hyodo et al. | 180/179 X |
| 4,597,469 | 7/1986 | Burney | 180/179 X |
| 4,697,478 | 10/1987 | Mastumoto et al. | 180/179 X |
| 4,766,971 | 8/1988 | Hyodo | 180/178 |
| 4,790,403 | 12/1988 | Akita et al. | 180/176 |
| 4,870,583 | 9/1989 | Takahashi et al. | 180/178 X |

FOREIGN PATENT DOCUMENTS

| | | | |
|---|---|---|---|
| 0230696 | 8/1987 | European Pat. Off. | 180/175 |
| 0157830 | 7/1987 | Japan | 180/175 |

Primary Examiner—Andres Kashnikow
Assistant Examiner—Brian L. Johnson
Attorney, Agent, or Firm—Sughrue, Mion, Zinn, Macpeak & Seas

[57] ABSTRACT

A fixed speed control device including a predetermined vehicle operating speed controller, a release time limit set-up system, a release switch system, and a memory system, which are all electronically connected to an electronic control circuit. The fixed operating speed control device controls the speed of a vehicle so that it is commesurate with a specified preset vehicle speed, and can release itself from the controlled speed when a deviation exceeds a specified value, and properly adopt one of ten control branches to meet various requirements of vehicle operation.

2 Claims, 8 Drawing Sheets

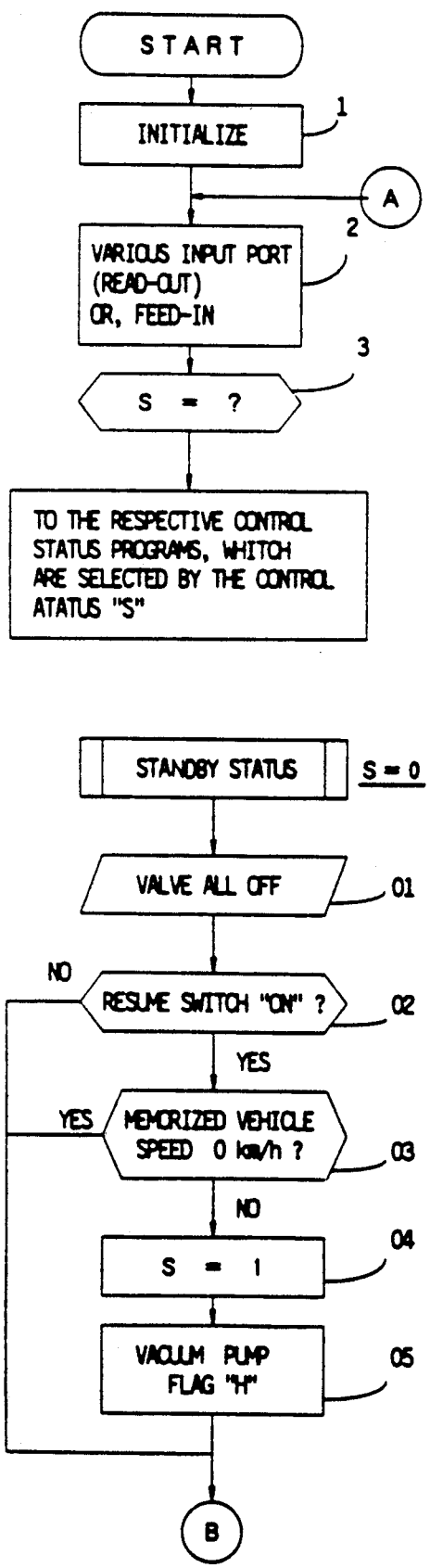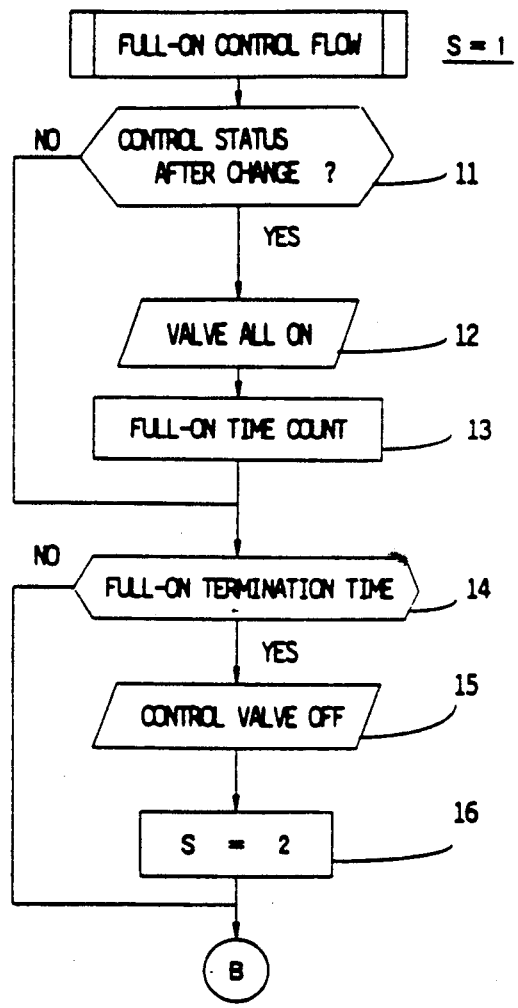

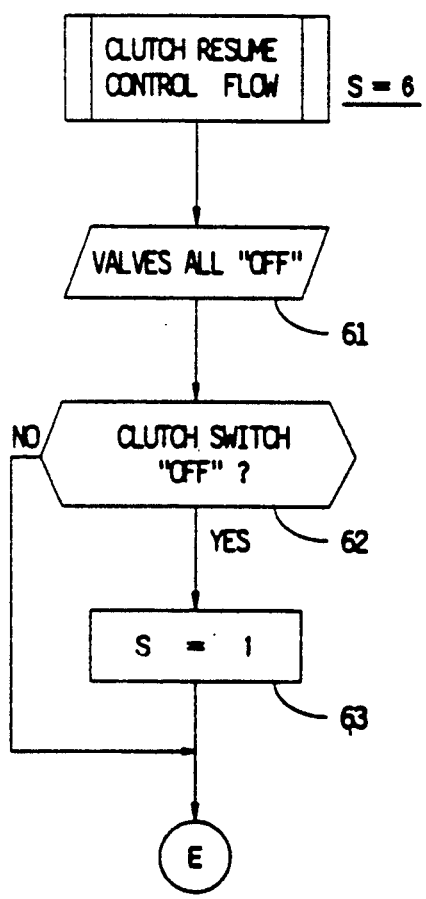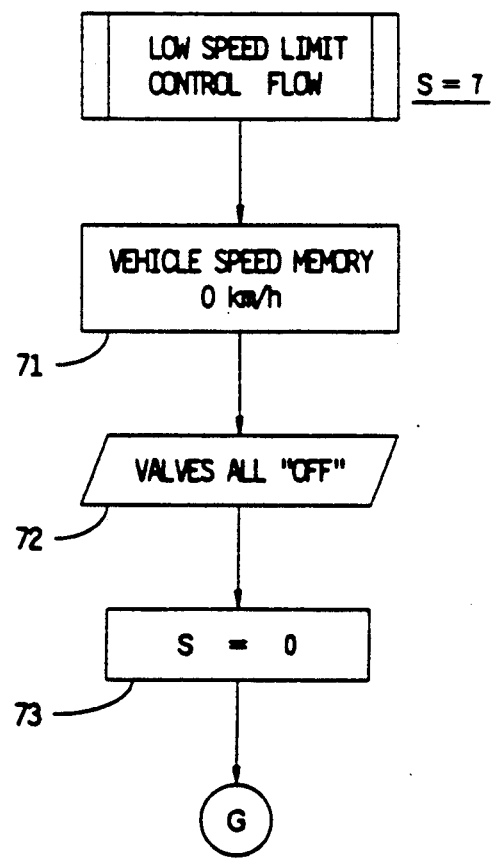

FIXED OPERATING SPEED CONTROL DEVICE

This is a continuation of application Ser. No. 07/250,880, filed Sept. 29, 1988, now abandoned.

FIELD OF THE INVENTION

This invention pertains to a fixed operating speed control device which controls the fixed operating speed of a vehicle by regulating opening and shutting of the throttle valve of the vehicle at a prefixed vehicle speed.

DESCRIPTION OF THE PRIOR ART

Examples of conventional fixed operating speed control devices are described in Patent Publications of Toku-Kai-Sho 58-128433 and 58-128434, in which the opening of a throttle valve of a vehicle engine is controlled so that the vehicle's speed is in accordance with a predetermined vehicle speed. When a comparison is made between the detected actual vehicle speed and the predetermined speed, and the ratio of detected speed to the predetermined speed becomes less than a set value, the controls for opening the throttle valve are released. As a consequence of the operation of such a device, the stop lamp switch and the parking switch often become inoperable. Subsequently, in a situation where the speed control cannot be released, other means of releasing speed control are required, in place of the aforementioned inoperable stop lamp switch or the parking indicator switch.

In such devices it is impractical to acurately release the control. For an example, if the prefixed vehicle speed is 60Km/h and 20Km/h is set for the releasable vehicle speed deviation, it cannot be released when the deviation is 18Km/h, but must reach the minimum 20Km/h. Therefore, in circumstances that do not allow for abrupt increase in the speed of the vehicle, speed deviation may occur despite any urgency to release control. Thus, the conventional devices disclosed in the Patent Publications may not be satisfactory. On the other hand, if the vehicle speed deviation, which may be used to release the fixed operating speed control is established at lower level, a problem of possible detachment from the fixed operating speed control may occur when the load is abruptly changed during fixed speed operation.

SUMMARY OF THE INVENTION

Therefore, it is an object of this invention to solve the above problems, and to provide a prefixed operating speed control device which can stop the fixed operating speed control corresponding to the specified vehicle speed deviation.

The fixed operating speed control device of this invention is comprised of a fixed operating speed device which controls the vehicle operating speed in order to eliminate deviation between the current vehicle operating speed and the prefixed vehicle speed; and a release time limit set-up device which establishes the time limit for stopping the aforementioned fixed op ®rating speed control device after an elapsed time interval which corresponds to the deviation.

The fixed operating speed control device of this invention is equipped with a fixed operating speed control device which controls the operating vehicle speed in order to eradicate vehicle deviation between the current vehicle operating speed and the prefixed vehicle operating speed, and the release time limit set-up device which establishes a time limit for stopping the aforementioned fixed operation speed control after an elapsed time corresponding to the aforementioned deviation when the deviation exceeds a specified value. The status of the device is self-sustaining and is maintained by a signal from a release time limit device. The operating vehicle speed control is stopped by a signal from a release switch device, while a signal from the release switch device can also release the self-sustaining condition.

This invention, in its normal condition, controls the vehicle operating speed so that it is close to the prefixed vehicle speed deviation between the prefixed vehicle speed and the current Vehicle operating speed. If the aforementioned vehicle speed deviation exceeds the specified value, the release time limit set-up device can stop the fixed operating speed control after expiration of the time limit corresponding to the aforementioned vehicle speed deviation.

The invention also controls the vehicle operating speed so that it is close to the prefixed vehicle speed, in order to eradicate the vehicle speed deviation between the prefixed vehicle speed and the current vehicle operating speed. If the vehicle speed deviation exceeds the specified value, the fixed operating speed control may be stopped by using the release time limit set-up device, after the time limit corresponding to the aforementioned vehicle speed deviation has elapsed. Stopping of the vehicle speed control is accomplished by a signal from the release time limit set-up device and is not accomplished by a signal from the release switch device. Thereafter, when a signal from the release switch device, which terminates control of the prefixed vehicle speed control device, is not achieved there is a possiblity of an abnormal condition occurring in which the fixed vehicle speed control is released by the release time limit set-up device, instead of the release switch device. Thus, it is prohibitive to resume the fixed operating vehicle speed control.

BRIEF DESCRIPTION OF THE DRAWINGS

The following detailed description of the preferred embodiments will be made with reference to the accompanying drawings, in which:

The FIG. 1 is circuit diagram of an embodiment of the fixed operating speed control device according to the present invention.

FIGS. 2-11 are the flow charts of the operation of the fixed operating speed control which is performed by the electronic control circuit.

DETAILED DESCRIPTION OF THE PREFERRED EMBODIMENTS

Figure 1:
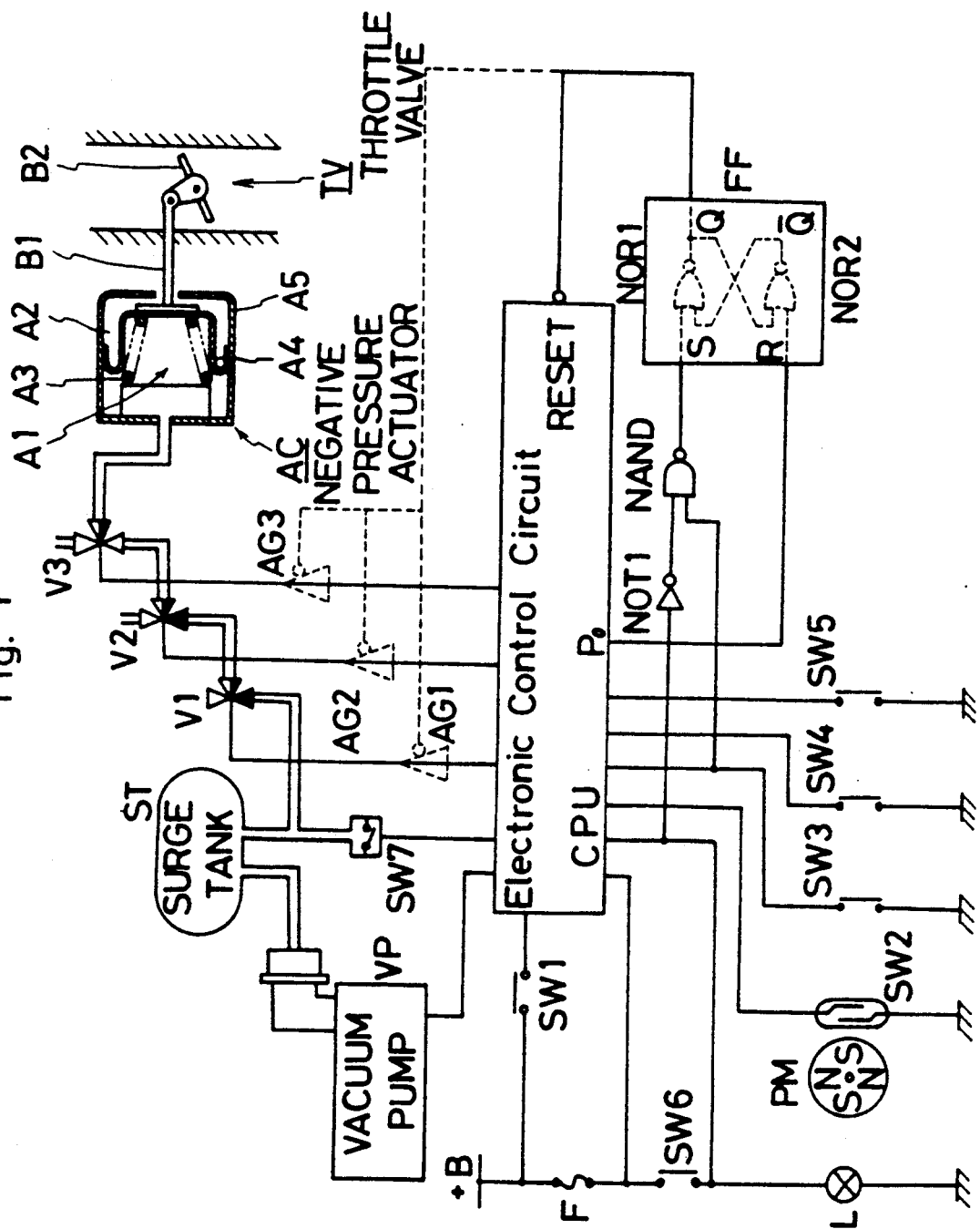
Figure 5:
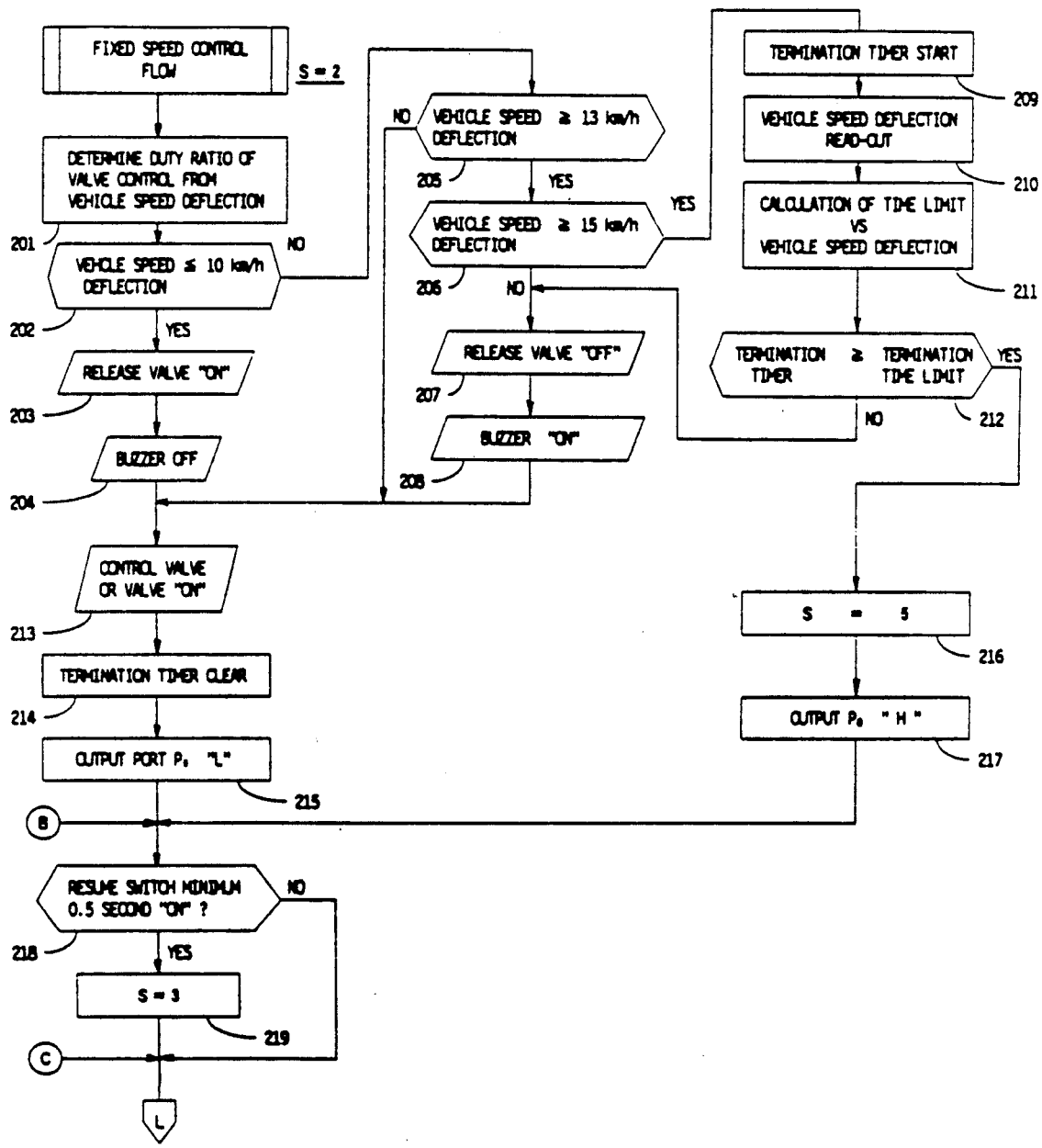
Figure 6:
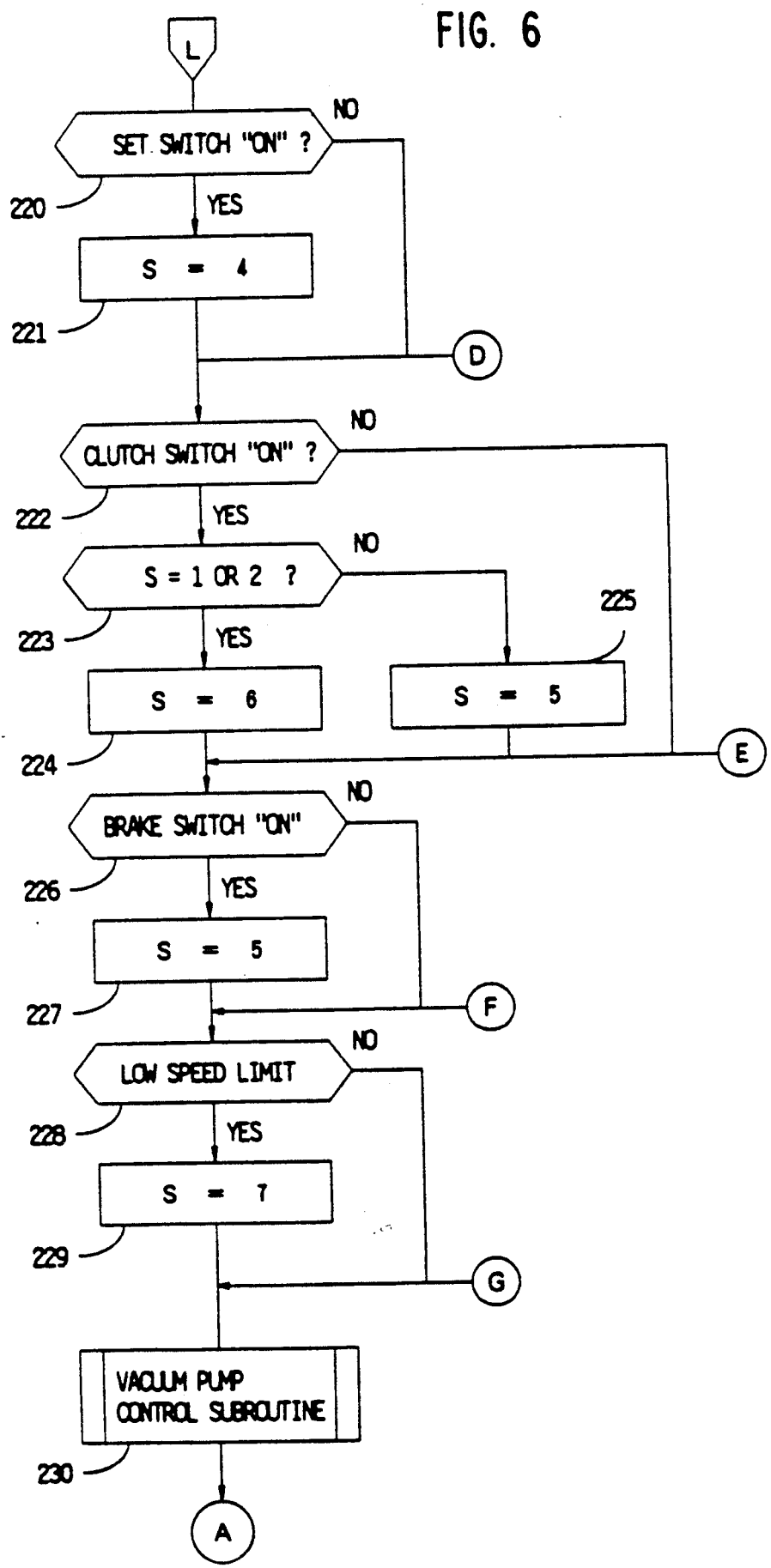

The electronic control circuit CPU shown in FIG. 1 is a single chip micro-computer. The CPU receives as inputs the outputs from the reed switch SW2 which detects vehicle speed, the clutch switch SW3 which detects clutch operation (not shown on the drawing), the brake switch SW6 which detects brake operation, the set switch SW4, and the resume switch SW5. The CPU also receives the output from the vacuum switch SW7 which is connected to the surge tank ST. The surge tank accumulates and stores negative pressure that is generated by the vacuum pump BP due to the operation of the actuator AC in controlling the opening and closing of the throttle valve TV.

The resume switch SW5 causes the fixed operating speed control, which was in a released and idle position, to return to a previously stored vehicle speed, and the clutch switch SW3 and the brake switch SW6 release the vehicle from fixed operating speed control.

There is a permanent magnet PM which is connected to the speedometer cable, (not shown) adjacent to the reed switch SW2. This permanent magnet PM rotates as the vehicle moves, and the contact points of the reed switch SW2 are opened or closed thus generating a frequency pulse (vehicle speed signal) proportional to the vehicle speed, and these signals are sent to the electronic control circuit CPU.

The clutch switch SW3 opens and closes with the clutch pedal. The brake switch SW6 is connected to the brake pedal and operates accordingly. The brake switch SW6 is also connected to the stop switch lamp L which is illuminated when the brake switch SW6 is in the "ON" (closed) position. The set switch SW4 and the resume switch SW5 are push-button types, and are located where the operator can easily operate them. When the set switch SW4 is pushed down, the vehicle operating speed is memorized and simultaneously the fixed operating speed control is initiated. When the brake switch SW6 or the clutch switch SW3 is operated, the fixed operating speed control is released, and the vehicle speed of that instant is memorized. When the resume switch SW5 is activated, the fixed operating control is restarted so that the vehicle returns to memorized vehicle speed that was memorized when the fixed operating speed control was released.

The brake switch SW6 is connected to the power source via fuse F and the electronic control circuit CPU is supplied with power via the power supply switch SW1.

The output of electronic control circuit CPU is connected to the solenoid of the control valve V1 which controls the negative pressure actuator AC and is connected via an operating circuit. In addition, the solenoid of the vent valve V2 and/or the solenoid of the release valve V3 are respectively connected to receive the output of the CPU.

The R terminal of Flip-Flop FF is connected to the output PO of the CPU, and the Q terminal output of the Flip-Flop FF is connected to the RESET terminal of the CPU in order to stop the microcomputer by means of a negative input. In case of an overloaded microcomputer, and where the frequency or duty ratio of pumping outputs are in excess of the specified limits, the input to the aforementioned RESET terminal will become the reset output of the Overload Supervisory Integrated Circuit (TA 7900) to stop the control of the micro-computer.

The Flip-Flop FF is a set-reset Flip-Flop and receives a signal that starts control of the CPU and the memory measure which will be described hereinunder is sent to the pair of NOR gates.

The set side input terminal S and the reset side input terminal R are triggered by rising signals. The set side terminal S receives the signal from the brake switch SW6 via the NOT circuit NOT 1 and the NAND circuit NAND, and also receives a signal from the clutch switch SW3 via the NAND circuit NAND.

The output Po of the CPU is connected at the reset side terminal R of the Flip-Flop FF so that the Flip-Flop FF interfaces with the output of the control release input device with feedback from the unusual deviation detecting device which detects when the deviation between the vehicle's operating speed and the vehicle s fixed speed exceeds a preset value thus terminating control of the aforementioned fixed operating speed control device.

As a result, when the reset side terminal R is in the "L" position, and the brake switch SW6 and the clutch switch SW3 are in the "ON" position, their rising signals set the Flip-Flop FF, and the output at Q terminal of the Flip-Flop FF becomes "H", and the output at $\overline{Q}$ terminal becomes "L". The "H" at the Q terminal output of the Flip-Flop FF is fed to the RESET terminal of the CPU, which in turn causes the CPU to function. The negative pressure actuator AC of the fixed operating speed control device in this embodiment functions as follows:

The negative pressure actuator AC has a negative pressure chamber A1 which is tightly sealed by the diaphragm A4 contained in the housing A5 and the atmosphere side A2 is located at the opposite side of the diaphragm A4. The diaphragm A4 is augmented by the pressure coil spring A3 which is located on the negative pressure chamber A1 side. The diaphragm A4 is connected to the throttle valve rod B1 which opens and shuts the valve B2 of the throttle valve TV. In addition, in the negative pressure chamber A1 of the aforementioned negative pressure actuator AC, negative pressure of the surge tank ST is induced via the control valve V1, the vent valve V2 and the release valve V3.

When the solenoid of the control valve V1 is energized, negative pressure in the surge tank ST builds up at the negative pressure actuator AC side, and when it is not energized the negative pressure is shut off. The vent valve V2 sends out negative pressure to the negative pressure actuator AC side which is sent out from the control valve V1 when its solenoid is energized, and when deenergized, the negative pressure built up at the negative pressure actuator AC side is released to the atmosphere. The release valve V3 releases the negative pressure in the negative pressure chamber A1 of the negative pressure actuator AC to the atmosphere when an abnormality occurs in the control system and makes it impossible to perform proper control, and brings the negative pressure chamber A1 to atmospheric pressure conditions. Then, the throttle valve TV is shut by the throttle valve rod B1 and the valve B2. Normally, the solenoid of the vent valve V3 is energized, and the vent valve V2 and the negative pressure chamber A1 of the negative pressure actuator AC are serially connected.

The control valve V1 and the vent valve V2 are controlled by the duty ratio of the CPU. In other words, a comparison is made between the memorized vehicle speed of the fixed operating speed control and the vehicle operating speed, and the duty ratio of the signals for energizing the solenoids of both control valve V1 and vent valve V2 are determined in order to minimize the speed differences. For example, the duty ratio becomes proportionally smaller when speed reduction is necessary, which results in a longer time for atmosphere to travel from the vent valve V2 to the negative pressure actuator AC thus closing the throttle valve TV by means of the diaphragm A4. Conversely, when acceleration is required, the duty ratio becomes larger, and the throttle valve TV is opened by means of the negative pressure actuator AC.

Further explanation of the operation of the electronic control circuit CPU will be made with reference to FIGS. 2 through 11.

First, when the power supply switch SW1 is put in the "ON" state, the program beginning in FIG. 2 is started. Step one is the initial set up of memories and various outputs of the CPU. At this step, the control status branching program is set at a control status S=O, i.e., "Standby status of the control branch." The output port Po is set at "L". In step 2 the present status of various ports are read, and in step 3 the control status S is determined to determine which function or branching step is to be performed. In other words, this program branches off according to the individual control status, and as the programming functions in accordance with the branching of the program. As was the case in step 1, the control status in step 3, is set at S=O "stand by status".

At this point the operational status of the resume switch SW5 is checked and the controls are maintained in a "cancel" status. At step 01, in FIG. 3, all valves including the control valve V1, vent valve V2 and release valve V3 are shut off and the fixed operating speed control is stopped due to the stoppage of control of the negative pressure actuator AC. In step 02 the operational status of the resume switch SW5 is checked. If the resume switch SW5 is in the "ON" position, and the memorized vehicle speed is not 0Km/h (clear condition) in step 03, then in step 04 the control status is set to S=1 "full-on control branch", and in step 05 the vacuum pump flag goes to the "H" position, which indicates the operational status of the vacuum pump BP. In other words, preparation is made to enter the control status S=1.

"Full-on control branch."

When the resume switch SW5 is not in the "ON" position or the memorized vehicle speed is not on 0Km/h (clear status), the resume function is denied and therefore the control status is not changed.

When the control status S=1, "Full on Control Branch", the negative pressure actuator AC is placed in the proper position. In other words, at control status S=4 "Reduced Speed Flow", the control valve V1 is in the "OFF" position and the pressure in the negative pressure chamber A1 of the negative pressure actuator AC is lowered. At "Standby Control" negative pressure in the negative pressure chamber A1 of the negative pressure actuator AC is not in accord with the fixed operating speed, since it is an instant after the fixed operating speed control is initiated, or after the "Cancel Control". In this step, it is impossible to open the throttle valve the proper amount, even if the fixed operating speed control is resumed and the control valve V1 is controlled by the duty ratio. Therefore, as shown in FIG. 4, in step 11 a determination is made whether this branch is being entered for the first time, and if so, all the valves including V1, V2 and V3 are placed in the "ON" position in step 12, and set to a full-on control time period, which is set up to prolong the time so as to be proportionate to the vehicle speed. When the full-on control time period is set after entering this flow, the time elapse of full-on control time which is set at step 14 is checked. When full-on control time period has elapsed, the control valve V1 is turned off in step 15, and set up control status S=2 : "Fixed Speed Control Branch" is achieved in step 16.

Control Status S=2 : "Fixed Speed Control Flow"

At this point, the vehicle speed is maintained at the memorized fixed speed, and the fixed operating speed control is stopped after a certain time limit corresponding to the speed, when speed deviation between the memorized vehicle speed and the current vehicle operating speed exceeds the proper value, i.e., 15Km/h or more in this embodiment.

In step 201 (FIG. 5), the vehicle speed is increased by the pulse of the reed switch SW2, vehicle speed deviation is calculated by comparing the memorized vehicle speed to the current vehicle operating speed, and the duty ratio which opens and closes the control valve V1 and the vent valve V2 is determined.

The steps 202 through 204 and the steps 213 through 215, are followed based on normal duty ratio control, and the steps 205 through 215 are followed when the vehicle operating speed cannot be controlled by the memorized vehicle speed even though the duty ratio control is applied to control the vehicle speed.

If the speed deviation is less than 10Km/h in step 202, the release valve V3 is set in the "ON" position, a buzzer is set to the "OFF" position in step 204, and the duty ratio control of the control valve V1 and the vent valve V2, in step 213 is carried out and the fixed operating speed control of the vehicle is normalized. In step 214 when vehicle speed deviation exceeds a set value, the release timer which measures the terminating time limit as per the vehicle speed deviation, is cleared and the output port Po is set to "L" in step 215.

When the vehicle speed deviation is greater than 13Km/h in step 205, and is determined to be smaller than 15Km/h, the release valve V3 is set to the "OFF" position, and the negative pressure in the negative pressure chamber A1 of the negative pressure actuator AC, is reduced so as to be equalized to the atmospheric pressure, and control of the throttle valve TV is released. In addition, the buzzer to is set to the "ON" state in step 208, to indicate that the vehicle speed deviation is greater than 13Km/h and to proceed through steps 213 through 215.

While the vehicle speed deviation is increased from 10Km/h in step 202, to 13Km/h in step 205, or the vehicle speed deviation is reduced from 13Km/h in step 202, to 10Km/h at step 205, the negative pressure actuator AC causes a hysterisis of the set value in order to resume control. When the vehicle speed deviation become greater than 15Km/h (the fixed value), the release timer is started, which measures the terminating time limit in accordance with the vehicle speed deviation in step 206.

Figure 12:
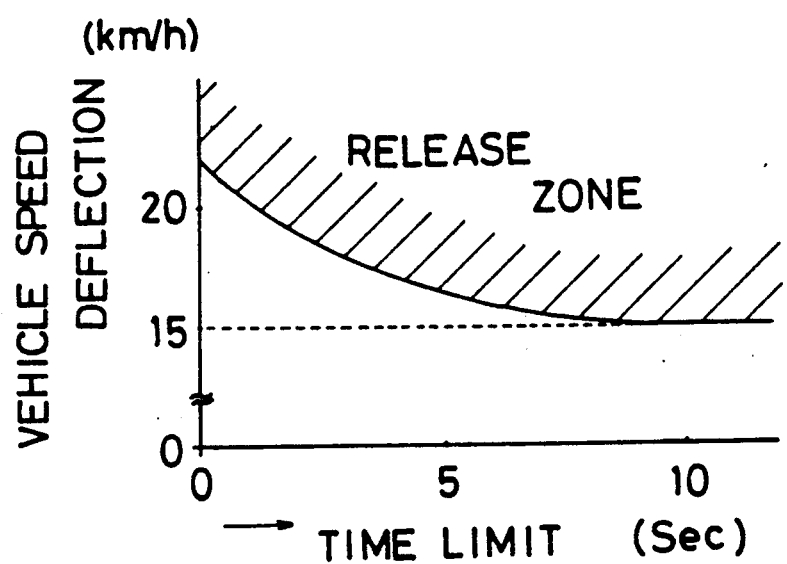
FIG. 12 is the cancel time limit set-up chart used in the embodiment shown in FIG. 2.

By reading out the vehicle speed deviation, calculated in step 201, in step 210, the time limit for terminating the fixed operating speed control in response to the vehicle speed deviation is determined in step 211. This time limit, as shown in the time limit set chart in the FIG. 12, is responsive to the vehicle speed deviation. When a comparison is made between the release timer in step 212 and the aforementioned releasing time limit, and the time set by the release timer is shorter then the aforementioned releasing time limit, then step 207 is carried out. If the time limit set by the release timer is longer than the aforementioned release time limit, the cancel function control status S=5 "Cancel Control Flow" in step 216 is carried out and the output port Po is set to "H" in step 217.

When the resume switch SW5 is kept in the "ON" state for longer than the set time (in this case, 0.5 second), control status S=3 "Acceleration Control Branch" will be set up in step 219. In addition, when the set switch SW4 is put in the "ON" position in step 220, in FIG. 6, control status S=4 "Speed Reduction Control Branch" is set up in step 221. When the clutch switch SW3 is "ON" in step 222, a determination is made whether the control status is S=1 or S=2 in step 223. In other words, since the clutch switch SW3 also initiates the resume function, it is necessary to determine from which branch it is fed in, e.g., either "Acceleration Control Branch" or "Speed Reduction Control Branch", and control status S=6 clutch "Resume Control Branch" is set up in step 224, or control status S=5 "Cancel Function Control Branch" is set up in step 225, when the cancel function is initiated when the clutch switch is "ON". When the brake switch SW6 is "ON" in step 226, control status S=5 "Cancel Control Branch" is set up in step 227. When the low speed limit is determined, and the vehicle operating speed is lower than the controlled vehicle speed in step 226, control status S=7 is set up in step 229 the fixed operating speed control is prohibited, and the "Vacuum Pump Control Subroutine" is carried out in the step 230.

Control Status S=3: "Speed Acceleration Control Branch"

Figure 7:
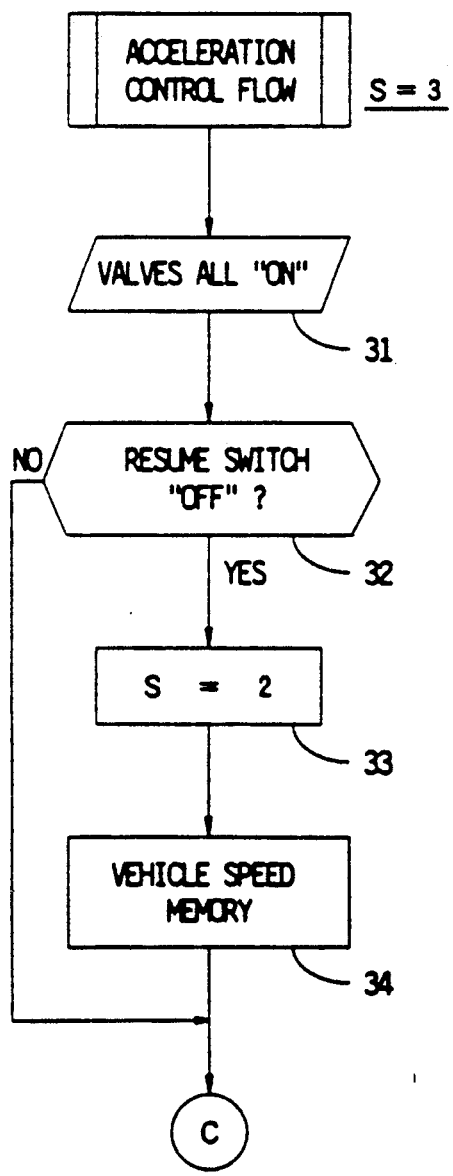

This branch establishes the fixed operating speed, by accelerating the vehicle speed during fixed operating speed control. In other words, as shown in FIG. 7, all valves including the control valve V1 the vent valve V2 and the release valve V3 are put in the "ON" state in step 31 to raise negative pressure level of the negative pressure chamber A1 of the negative pressure actuator AC and open the throttle valve TV. Thus, the speed is fully accelerated until the resume switch SW5 is set to the "OFF" position in step 32. When the resume switch SW5 is "OFF", control status S=2 "Fixed Speed Control Branch" is set up in step 33, and the at that time is stored in the memory in step 34.

Control Status S=4: "Speed Reduction Control Branch"

Figure 8:
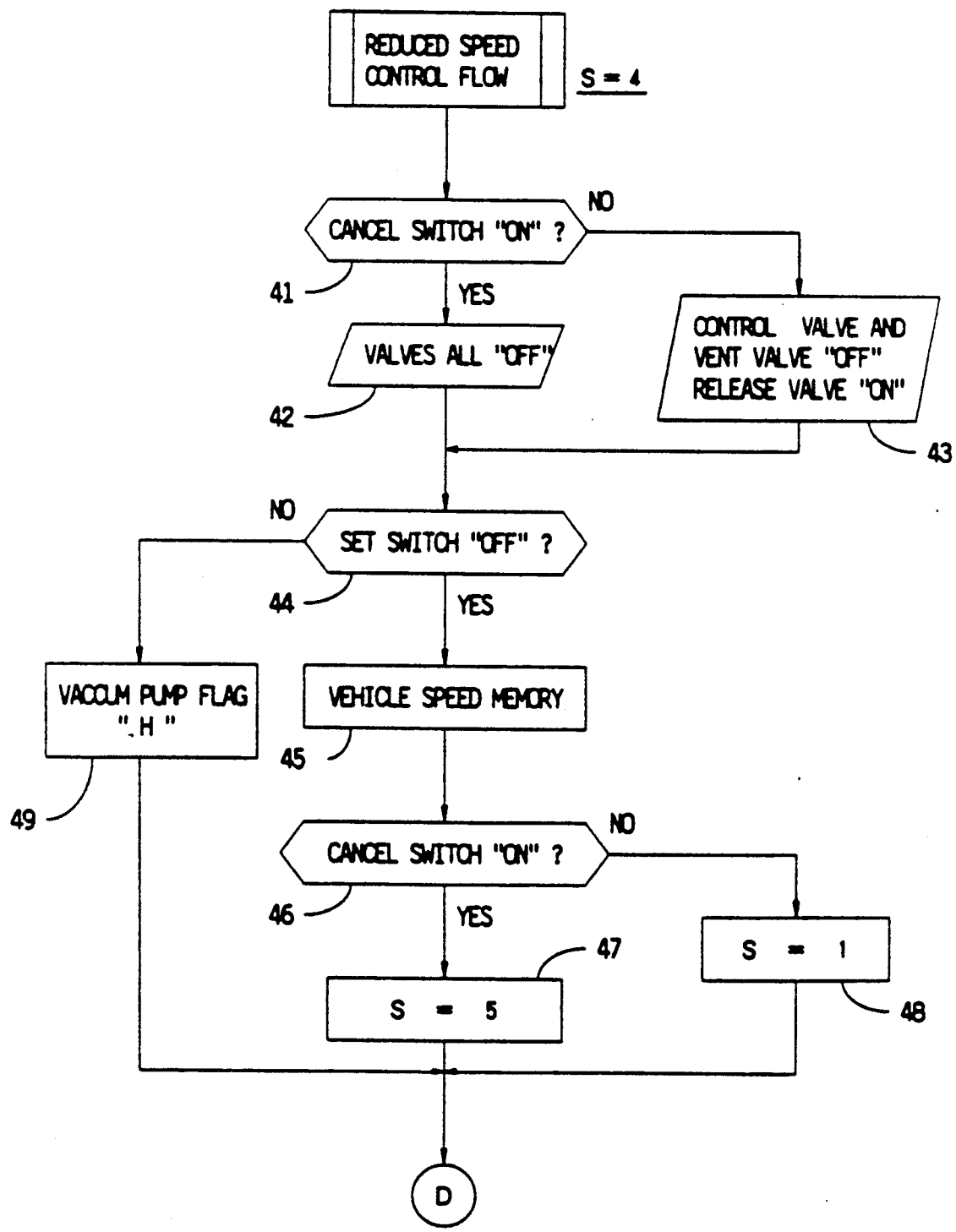

This branch is intended to reduce the speed of the vehicle during the fixed operating speed control and then to resume the fixed operating speed control. When the set switch SW4 is "ON" during the fixed operating speed control, control status S=4, i.e., "Speed Reduction Control Branch" is induced as illustrated in FIG. 8. When either the clutch switch SW3, which initiates the cancel function, or the brake switch SW6 is "ON" in step 41, all valves including V1, V2 and V3 are "OFF" in step 42, and the fixed operating speed control is stopped after initiating the "Speed Reduction Control Branch". When neither the clutch switch SW3 nor the brake switch SW6 is "ON" the control valve V1 and the vent valve V2 are "OFF" in step 43 and the release valve V3 is "ON". Thus, the negative pressure supply of the negative pressure actuator AC is "OFF", the throttle valve is gradually closed and the vehicle speed is gradually reduced. When the set switch is set to "OFF" in SW4, step 44, the vehicle speed at that time is memorized in step 45. In step 46, either the clutch switch SW3 also having the cancel function, or the brake switch SW6 is "ON" and the "Full-On Control Branch" is entered by setting control status S=1 in step 48, so long as the fixed operating speed control is not disengaged. In other words, the speed reduction control is continuously maintaining as long as the set switch SW4 is "ON", and the fixed operating speed is resumed at the vehicle speed at the time of the set switch, SW4 became "OFF". When either the clutch switch SW3 or the brake switch, SW6 is set to "ON" in step 46, control status S=5 "Cancel Control Branch" is set up in step 47. When the set switch SW4 is "ON" in step 44, the vacuum pump flag is set to "H" in step 49.

Control Status S=5: "Cancel"

Figure 9:
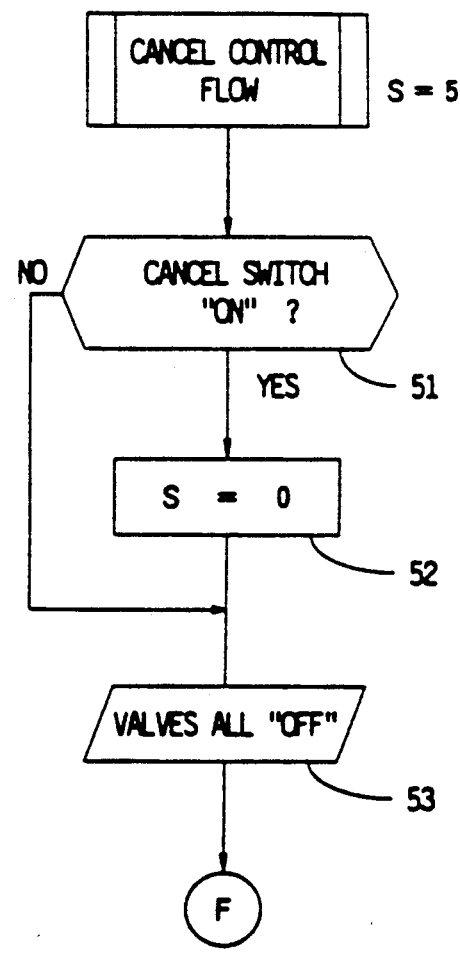

This branch releases the fixed operating speed control, when either the brake switch SW6 or the clutch switch SW3 becomes "ON" during the control status S=2 "Fixed Speed Control Branch". As shown in FIG. 9, either the clutch switch SW3 having the cancel function, or the brake switch SW6 is "ON" in step 51, and control status S=0 "Standby Control Branch" is selected in step 52, so that all valves including V1, V2, and V3 are in the "OFF" position in step 53.

Control Status S=6: "Clutch Resume Control Branch"

This branch, as shown in FIG. 10, permits the resumption of the fixed operating speed control upon the release of the fixed operating speed control during the control status S=2 "Fixed Speed Control Branch" when the clutch switch SW3 becomes "ON". First, all valves including V1, V2, and V3 are set to the "OFF" condition, and when it is determined that the clutch switch SW3 is "OFF" in step 62, control status S=1 "Full-On Control Branch" is induced in step 63.

Control Status S=7: "Slow Speed Limit Control Branch"

This branch cancels and clears the memorized speed when the vehicle speed is lower than the specified speed in steps 219 and 220. As shown in FIG. 11, the memorized speed is cleared in step 71, all valves V1, V2, and V3 are set to "OFF", and control status S=0 "Standby Control Branch" is entered in step 73.

The foregoing is the explanation of the various control status flows. The "Vacuum Pump Control Subroutine" is excluded from this explanation as it is not directly relevant to the invention.

As described above, in the fixed operating speed control device, when the vehicle speed deviation exceeds 15Km/h, the release timer is started to measure the time interval for termination corresponding to vehicle speed deviation in step 209, read the vehicle speed deviation in step 210, and determine the time interval to stop the fixed operating speed control corresponding to vehicle speed deviation in step 211. A comparison is made between the release timer's time limit and the releasing time interval in step 212, the release valve V3 is set to "OFF", negative pressure in the negative pressure chamber A1 of the negative pressure actuator AC is reduced to be equalized to atmospheric pressure, and further, an indication that the vehicle speed deviation became greater than 13Km/h is generated by turning the buzzer to "ON", when the release timer's time limit is shorter than the above releasing time interval. When the release timer s time limit is longer than the releasing time interval in step 212, control status S=5 "Cancel Control Branch" is set up in step 212, and the output port Po is set to "H" in step 217.

Accordingly, the time limit for stopping the fixed speed control is determined so as to correspond to the vehicle speed deviation, when vehicle speed deviation becomes greater than the specified value during the fixed operating speed control, and control status S=5 of "Cancel Control Branch" is set up, thus terminating the fixed operating speed control, when the releasing time has elapsed.

As a result, the fixed operating speed control measure is achieved to control the vehicle operating speed and to eradicate vehicle speed deviation between the currently operating vehicle speed and prefixed vehicle speed stored in the micro-computer which comprise the electronic control circuit CPU. A releasing time limit measure is set up to stop the fixed operating speed control after an elapsed time, corresponding to the aforementioned deviation, when the vehicle speed deviation becomes larger than the specified value, in order to eradicate vehicle speed deviation between the current operating vehicle speed and the prefixed vehicle speed. These combined measures can stop the fixed operating speed within the time limit corresponding to the vehicle speed deviation, when vehicle speed deviation becomes greater than the specified value during the fixed operating speed control.

Control status S=5 "Cancel Control Branch" for cancel functions is established while the output port Po is set to "H", and is fed to the R terminal of the Flip-Flop FF, and the output of the Q terminal of the Flip-Flop FF, is set at "L" and the RESET terminal of the CPU is set to "L". Therefore, the CPU is cleared regardless of implementing control program, and the fixed operating speed control is stopped.

When the vehicle speed deviation is less than 15Km/h, the output port Po is positioned at "L", and even if the output of the Q terminal is in an unfixed condition and set at "L", the signal from the S terminal of the Flip-Flop FF, becomes "H" as well as Q terminal of the Flip-Flop FF, due to the driver s operation of the clutch switch SW3 or the brake switch SW6, which allows the vehicle speed deviation to exceed 15Km/h during the fixed operating speed control, and the condition remains on unless the releasing time limit corresponding to vehicle speed deviation has elapsed.

As described above, when vehicle speed deviation exceeds 15Km/h during the fixed operating speed control, the releasing time limit corresponding to vehicle speed deviation elapses control status S=5 of "Cancel Control Branch" of the cancel function in step 216 is initiated, and the output Ps becomes "H" in step 217, the output of the Q terminal of the Flip-Flop FF, becomes "L" to put the RESET terminal to "L" and thus clear the CPU regardless of the control program and stop the fixed operating speed control. At this time, the driver's operation of the clutch switch SW3 and the brake switch SW6 set up the Flip-Flop FF, and the output of the Q terminal of Flip-Flop FF becomes "H" enabling the fixed operating speed control to function once again.

However, once vehicle speed deviation, during the fixed operating speed control, exceeds 15Km/h, and the time limit corresponding to vehicle speed deviation has elapsed, even the depression of the clutch pedal and the brake pedal will not result in the resumption of the fixed operation speed control unless the clutch switch SW3 or the brake switch SW6 is not initiated. In the above described example, vehicle speed deviation exceeding 15Km/h during the fixed operating speed control, and the conclusion of the release time limit corresponding to vehicle speed deviation causes the output from the Flip-Flop FF to make the RESET terminal of the CPU be "L" and thus clear the CPU, and stop the fixed operating speed control, which is the equivalent to the circuit composition as shown by the dotted line in FIG. 1 (which shuts off the Flip-Flop FF).

The basic composition is the same as the embodiment described above. Therefore, only the differences are explained in the following.

The outputs of the CPU are respectively connected to the solenoid of control valve V1, which controls negative pressure actuator AC through gate device AG1 and, when necessary, through a driving circuit of the analog gate circuit which comprises the gate device AG2, and through the solenoid of the release valve V3 through the gate device AG3 and, when necessary, through the driving circuit which comprises these gate devices. The gate inputs of the gate AG1, gate AG2 and gate AG3, are receive the output of the Q terminal of the Flip-Flop, and the other inputs of the gate AG1, AG2, and AG3 receive the outputs of the control valve V1, the vent valve V2 an the release valve V3, in the CPU.

In this embodiment, when the vehicle speed deviation becomes excessive during the fixed operating speed control, and the time limit corresponding to the vehicle speed deviation has elapsed, control status S=5 of "Cancel Control Branch"0 is set up in step 216, and the output port Po makes the output of the Q terminal of the Flip-Flop FF close the gates AG1, AG2 and AG3 and governs the output of the control valve V1, the vent valve V2 and the release valve V3 of the CPU. In this operation, the driver operates the clutch switch SW3 to set up the Flip-Flop, the output of the Q terminal of the Flip-Flop FF become "H", and thus the fixed operating speed control is once again realized. Once the vehicle speed deviation exceeds 15Km/h during the fixed operating speed control, and the time limit corresponding the vehicle speed deviation has elapsed, even the depression of the clutch pedal and the brake pedal will not result in establishment of the fixed speed control, despite the initialization of the CPU, unless the clutch switch SW3, or the brake switch SW6, is not activated.

As described above, the fixed operating speed control device according to this embodiment, is comprised of the fixed operating speed control device for eradicating vehicle speed deviation of the currently operating vehicle as compared to the pre-fixed operating speed control. The release time limit set device, which sets the time limit for stopping the fixed operating speed control after the time limit corresponding to the aforementioned speed deviation when the speed deviation exceeds the specified value has elapsed. The microcomputer of the CPU integrates these measures, and the fixed operating speed control can be stopped by the control program when the release time limit corresponding to vehicle speed deviation has elapsed.

In addition, the fixed operating speed control device of this embodiment is equipped with the fixed operating speed control device to control the speed of the operating vehicle so that it is substantially close to the pre-fixed vehicle speed in order to eradicate vehicle speed deviation. The releasing time limit setting device sets up time limit for stopping the fixed operating speed control after the time corresponding to the speed deviation, and the micro-computer of the CPU includes the aforementioned devices.

The release switch devices of the brake switch SW6 or the clutch switch SW3, which terminate control of the fixed operating speed control device, and the memory which governs the self-maintaining of status of the signal from the aforementioned release time set-up device, release the self-maintaining status of the signal from the release switch device and controls the aforementioned fixed operating speed control device under the self-maintaining conditions.

Therefore, when vehicle speed deviation exceeds specified value, and the time exceeds the time limit corresponding to the vehicle speed deviation, the control program can stop the fixed speed control, and even if the fixed operating speed control is not stopped by the control program, the condition is automatically maintained by a signal from the aforementioned release time limit set-up device.

The self-maintaining status can be released by the signal from the release switch device, while the fixed operating speed control can be stopped, the fixed operating speed control of the CPU can be stored, which may be by a signal from release time limit set-up device, despite the fact that signals from the release switch device including the brake switch SW6, and clutch switch SW3, do not reach the memory device which governs control of the fixed operating speed control measure.

When the fixed operating speed control is restarted again, it can resume the fixed operating speed control, provided that the release switch device including the brake switch SW3 and the clutch switch SW6, is in a normal state and upon confirmation that they generate a signal. As a consequence, the driver can prevent the fixed operating speed control from being activated even without noticing an abnormality in the clutch switch SW3 and the brake switch SW6. The CPU produces signals that indicate when the vehicle speed exceeds the vehicle speed deviation during the fixed operating speed control, and signals indicating that the time limit corresponding to the vehicle speed obviation has elapsed. The CPU, can stop itself even if there is an abnormality in the Flip-Flop FF, which is designed to have self-maintaining functions.

Even though treatment of the fixed operating speed control device which controls the vehicle speed in order to eliminate the vehicle speed deviation between the operating vehicle speed and the pre-fixed speed, and the release time limit set-up device, which sets up the time limit to stop the operating speed control device after the time corresponding to vehicle speed deviation has elapsed when the vehicle speed deviation exceeds specified value, by means of micro-computer including the CPU, any other electronic circuit can be used in place of the CPU in the example of this practice, when this invention is implemented.

The release time limit set-up device which establishes time limit for stopping the above fixed operating speed control after a time elapse corresponding to the deviation, is derived from the cancel time limit set-up chart in FIG. 12, and also an appropriate formula, such as Y=a/X=b (Y: Vehicle Speed Deflection, X: Time Limit, a. and b.: constants), can be adopted, when this invention is implemented. In the alternative, the relationship between the vehicle speed deviation and the elapsed time can be determined by the appropriate integral calculus.

The release switch device which terminates the fixed operating speed control device in the aforementioned embodiment, includes the brake switch SW6 and the clutch switch SW3. However, other kinds of switches designed exclusively for the purpose can be adopted. Alternatively, in implementing this invention, the release switch device can be activated by the brake switch SW6 alone, or the clutch switch SW3 alone or the clutch switch SW3 and the brake switch SW6.

Further, the memory which governs the self-maintaining status of the signal from the release time limit set-up device, and releases the self-maintaining status by the signal from the terminating device, while governing controls of the fixed operating speed control device, need not include only the Flip-Flop, or the logic circuit arranged in the Flip-Flop, but also other means may be used. Examples include having the release time limit set-up device operate to self-maintain its status from the signal from the fixed operating speed control device, and the self-maintenance can be released by the signal from the release switches including the clutch switch SW3, and/or the brake switch SW6, and it is also possible to use a self-contained relay and memory, etc.

As described above, the fixed operating speed control device controls operating vehicle speed in order to eradicate vehicle speed with the pre-fixed operating speed control device, and the release time limit set-up device which establishes a time limit to stop the aforementioned fixed operating speed control after a time, corresponding to the vehicle speed deviation, has elapsed, and the appropriate fixed operating speed control program can stop the fixed operating speed control after an elapsed time corresponding to the vehicle speed deviation, when the vehicle speed deviation exceeds the specified value.

Other features of the fixed operating speed control device of this invention include, controlling the vehicle operating speed by eradicating vehicle speed deviation between the operating vehicle speed and the pre-fixed operating speed, the release time limit set-up device which establishes time limit for stopping the aforementioned fixed operating speed control device after an elapsed time which corresponds to the vehicle speed deviation when vehicle speed exceeds the specified value; the memory which governs controls of the aforementioned fixed operating speed control device in a self-maintaining status while releasing the self-maintaining status by a signal from the release switch device which terminates control of the fixed operating speed control device and stops the fixed operating speed control after an elapsed time corresponding to the vehicle speed deviation when the vehicle speed deviation exceeds the specified value.

In addition to these features, the memory stores the signal from the release time limit set-up device to stop the fixed operating speed control, the fixed operating speed control is prevented from resuming operation even when an abnormality occurs in the fixed operating speed control device. Therefore, the driver can be prevented from entering the fixed operating speed control device without noticing possible abnormality in the release switch devices.

What is claimed is:

1. A vehicle fixed operating speed control device comprising:
   means for detecting the speed of said vehicle and generating a signal proportional to said detected vehicle speed;
   means for detecting the operation of a clutch;
   means for detecting the operation of a brake;
   means for setting a fixed operating speed;
   means for resuming a previously stored vehicle speed;
   a central processor, said central processor being connected to and receiving signals from said means for detecting the vehicle speed, said means for detecting the operation of a clutch, said means for detecting the operation of a brake, said means for setting said fixed operating speed and said means for resuming, said central processor including control program means for stopping said fixed operating speed control when a release time limit corresponding to a deviation between said vehicle current operating speed and said set operating speed has elapsed; and flip-flop circuit means connected to receive signals from said means for detecting the operation of a clutch and said means for detecting the operation of a brake, and an output of said flip-flop circuit means connected to an input reset terminal of said central processor whereby said vehicle is released from said fixed operating speed control by said means for detecting the operation of a clutch upon operation of a clutch and is released from said fixed operating speed control by said means for detecting the operation of a brake upon operation of a brake.

2. A vehicle fixed operating speed control device as claimed in claim 1, wherein said central processor is provided with memory means which stores the current operating speed of said vehicle to initiate operation of said fixed operating speed control.

* * * * *